United States Patent
Mather et al.

(10) Patent No.: US 9,274,345 B2
(45) Date of Patent: Mar. 1, 2016

(54) MULTIPLE VIEW DISPLAY

(75) Inventors: Jonathan Mather, Oxford (GB); Nathan James Smith, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 493 days.

(21) Appl. No.: 13/496,106

(22) PCT Filed: Sep. 21, 2010

(86) PCT No.: PCT/JP2010/066749
§ 371 (c)(1),
(2), (4) Date: Mar. 14, 2012

(87) PCT Pub. No.: WO2011/034219
PCT Pub. Date: Mar. 24, 2011

(65) Prior Publication Data
US 2012/0176378 A1 Jul. 12, 2012

(30) Foreign Application Priority Data

Sep. 18, 2009 (GB) .................................. 0916398.1

(51) Int. Cl.
G06T 15/00 (2011.01)
G02B 27/22 (2006.01)
(52) U.S. Cl.
CPC .................................. G02B 27/2214 (2013.01)
(58) Field of Classification Search
CPC ................................................... G02B 27/2214
USPC ............................................. 345/419; 348/51
See application file for complete search history.

(56) References Cited

U.S. PATENT DOCUMENTS

| | | | | |
|---|---|---|---|---|
| 5,644,431 A | * | 7/1997 | Magee | ........................... 359/619 |
| 6,130,777 A | | 10/2000 | Yamashita et al. | |
| 6,369,949 B1 | * | 4/2002 | Conley | ........................... 359/619 |
| 6,527,393 B1 | * | 3/2003 | Ogawa | ............................. 353/38 |

(Continued)

FOREIGN PATENT DOCUMENTS

| | | |
|---|---|---|
| CN | 1860403 A | 11/2006 |
| GB | 2405542 | 3/2005 |

(Continued)

OTHER PUBLICATIONS

International Search Report for PCT/JP2010/066749 mailed Dec. 21, 2010.

(Continued)

Primary Examiner — Christopher S Kelley
Assistant Examiner — Zhihan Zhou
(74) Attorney, Agent, or Firm — Nixon & Vanderhye P.C.

(57) ABSTRACT

A multiple view display comprises a display device and a plurality of converging lenses, such as a lenticular screen. Each lens cooperates with a respective region of the display device comprising one or more pixels (L) for displaying part of a first image for viewing in a first viewing region (Region 2 windows) and second pixels (R) for displaying part of a second image for viewing in a second region (Region 1 windows). The second pixels (R) are spaced horizontally from the first pixels (L). Each lens comprises first and second portions (Region 1, Region 2) extending vertically and parallel to each other and having lens centers (Lens Center 1, Lens Center 2) spaced apart horizontally. Each lens forming first and second images of the respective region of the display device, the first and second images being displaced from one another in the horizontal direction.

18 Claims, 17 Drawing Sheets

(56) References Cited

U.S. PATENT DOCUMENTS

| | | | |
|---|---|---|---|
| 7,002,748 B1 | 2/2006 | Conley et al. | |
| 7,070,278 B2 | 7/2006 | Pezzaniti | |
| 7,494,223 B2* | 2/2009 | Inamoto | 353/20 |
| 2002/0018299 A1* | 2/2002 | Daniell | 359/622 |
| 2002/0030894 A1* | 3/2002 | Volcker et al. | 359/619 |
| 2002/0113866 A1* | 8/2002 | Taniguchi et al. | 348/51 |
| 2002/0159111 A1* | 10/2002 | Suzuki et al. | 359/32 |
| 2005/0024590 A1 | 2/2005 | Pezzaniti | |
| 2005/0046799 A1 | 3/2005 | Pezzaniti | |
| 2006/0195293 A1 | 8/2006 | Koike et al. | |
| 2006/0227068 A1 | 10/2006 | Fukaishi et al. | |
| 2007/0035829 A1* | 2/2007 | Woodgate et al. | 359/462 |
| 2007/0183033 A1 | 8/2007 | Schwerdtner | |
| 2008/0025571 A1* | 1/2008 | Nakao et al. | 382/107 |
| 2008/0068452 A1* | 3/2008 | Nakao et al. | 348/36 |
| 2008/0204873 A1* | 8/2008 | Daniell | 359/463 |
| 2009/0009866 A1* | 1/2009 | Hisakado et al. | 359/500 |
| 2011/0018860 A1* | 1/2011 | Parry-Jones et al. | 345/214 |

FOREIGN PATENT DOCUMENTS

| | | | |
|---|---|---|---|
| GB | 2405543 A * | 3/2005 | |
| GB | 2406730 | 4/2005 | |
| GB | 2415850 | 1/2006 | |
| GB | 2422737 | 8/2006 | |
| GB | 2457691 | 8/2009 | |
| GB | 2461907 | 1/2010 | |
| JP | 9-189883 A | 7/1997 | |
| JP | 2006-235415 | 9/2006 | |
| JP | 2006-284872 A | 10/2006 | |
| WO | WO 2009104817 A1 * | 8/2009 | |

OTHER PUBLICATIONS

Written Opinion of the International Searching Authority mailed Dec. 21, 2010.

H. Yamamoto et al., "Optimum Parameters and Viewing Areas of Stereoscopic Full Colour LED Display Using Parallex Barrier", IEICE Trans Electron, vol. E83-c, No. 10 Oct. 2000.

M. Nishiguchi et al., "Tabletop Life Review Therapy System Using Olfactory Display for Presenting Flavor", Proceedings of the International MultiConference of Engineers and Computer Scientists 2010 vol. I, IMECS 2010, Mar. 17-19, 2010, Hong Kong.

Supplementary European Search Report mailed May 13, 2014 in corresponding EP application 10817330.3.

* cited by examiner

FIG. 4
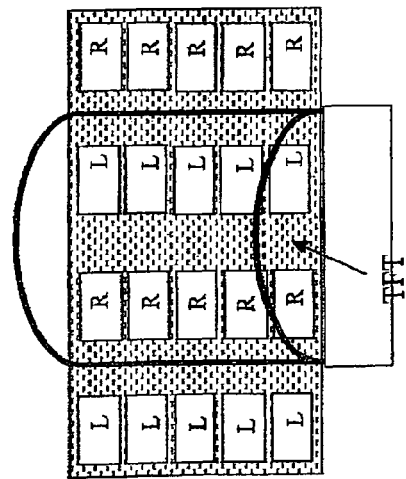
a). Front view – rotated pixels
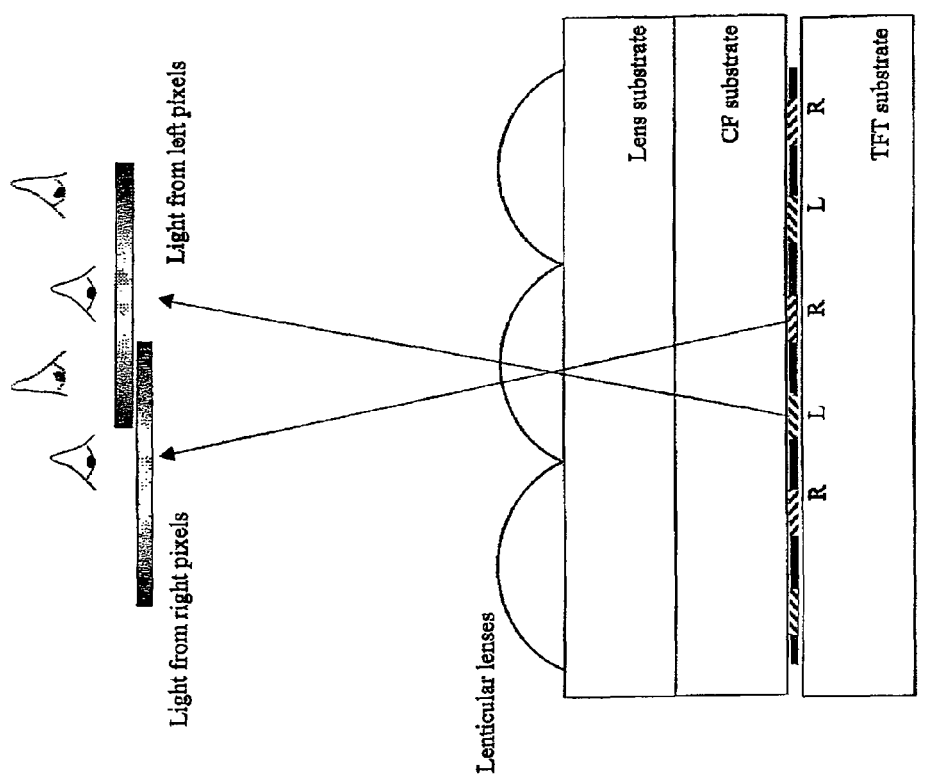
b). Cross sectional view Front view – rotated pixels Cross sectional view Cross sectional view of lens shape.

Cross sectional view of alternative lens shape.

Lens refractive index=1.56 a) Cross section of a lens split into 4 regions    b) Lens split into regions along the length of the lens FIG. 15
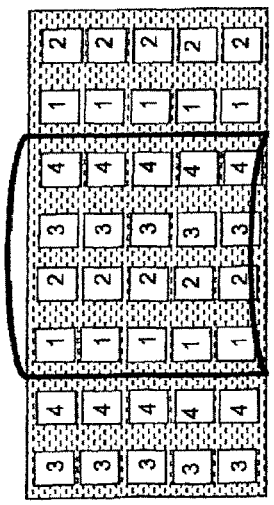
a). Front view – rotated pixels
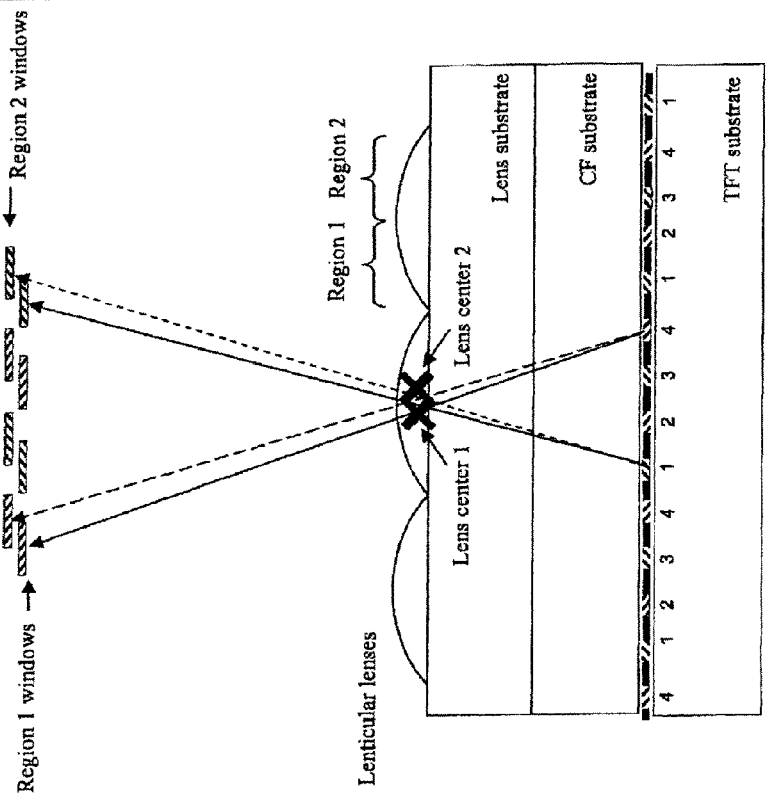
b). Cross sectional view

MULTIPLE VIEW DISPLAY

This application is the U.S. national phase of International Application No. PCT/JP2010/066749 filed 21 Sep. 2010 which designated the U.S. and claims priority to GB 0916398.1 filed 18 Sep. 2009, the entire contents of each of which are hereby incorporated by reference.

TECHNICAL FIELD

This invention relates to multi-view displays such as autostereoscopic displays, dual view displays, and directional displays which change their appearance depending on the angle from which they are viewed. It may be used in high resolution autostereoscopic displays where the sub pixels are orientated in a landscape orientation, as might be used in hand held games devices.

BACKGROUND ART

A stereoscopic display gives the illusion of depth in the image by giving each eye a different perspective of a scene, as would happen in reality. The brain then fuses these perspectives together to form a 3D representation of the image in the brain. For example, this may be done by displaying one perspective with one polarisation, and the other perspective in a different polarisation. A viewer can then see stereoscopic depth by wearing glasses where each eye piece only allows the appropriate polarisation to pass.

An auto-stereoscopic display is a display that gives stereoscopic depth without the user needing to wear glasses. It does this by projecting a different image to each eye. These displays can be achieved by using parallax optic technology such as a parallax barrier or lenticular lenses.

These types of displays are well known in the literature. For instance, the design and operation of a parallax barrier for 3D is well described in a paper from the University of Tokushima Japan (Optimum parameters and viewing areas of stereoscopic full colour LED display using parallax barrier, Hirotsugu Yamamoto et al., IEICE trans electron, vol E83-c no 10 Oct. 2000).

In summary, FIGS. 1a and 1b of the accompanying drawings shows the basics of the parallax barrier operation and design in a cross sectional diagram of an auto-stereoscopic parallax barrier design. The images for the left and right eye are interlaced on alternate columns of pixels, as for previous designs. The slits in the parallax barrier allow the viewer to see only left image pixels from the position of their left eye and right image pixels from the right eye, just as for a dual view parallax barrier.

The viewer may look on axis at the display to see a stereoscopic view, but note that they may also see a stereoscopic view off axis as shown in the Figure. The on axis view is termed the primary viewing window and the off axis view is called the secondary viewing window.

The same 3D effect can be achieved by using lenticular lenses. Each lens is substantially equivalent to a slit on the parallax barrier. FIGS. 2a and 2b show a conventional 3D system using lenticular lenses. The lenses image the pixels to the viewer (who is typically 300 mm from the panel). As shown in the diagram, light from the left pixels is directed into the observer's left eye, and vice versa. To achieve this, the focal length is typically set such that it is about equal to the lens-pixel separation distance (so that the focal length of the lens is approximately at the plane of the pixels).

This design works very well and has been used for many years to create good stereoscopic displays.

In a less common design for a 3D display, the pixels have large spaces between them. This causes problems with the design of a 3D display. For example, large spaces between the pixels might occur if the pixels in an LCD display panel need to be rotated by 90 degrees as shown in FIG. 3.

The black mask region has the function of covering the electronics that exist in the display. In an active matrix LCD display each pixel has an associated thin film transistor (TFT) which is masked by the black mask. These TFTs are usually positioned above each pixel and this explains why there is a larger region of black mask above each pixel in FIG. 1a, than to the left and right sides of each pixel. With the rotated pixel design of FIG. 3a the TFTs are to the right of each pixel so that there is a substantial gap to the right of each pixel. Such a design might exist in a games console where the screen is used in a landscape orientation.

The effect of the gaps if used with a standard lenticular design is illustrated in FIGS. 3a and 3b. With a conventional design the lenticular lenses are focused on the pixels and so create an image of the pixels in the plane of the observer. The light from the left pixel is imaged to the left eye and vice versa, but in between the observers eyes there is a region of darkness caused by the image of the black mask. If the viewer moves slightly off axis the display will appear dark as they move into the dark region created by the black mask and lenses. When viewing a 3D image, this reduces the freedom that the viewer has to move from side to side. In addition a 3D display may be used as a 2D display by making the left and right images the same. However with the dark regions that exist at some angles, the usability of the 2D display is also reduced.

One known solution to this problem is to de-focus the lenticular lenses by making their focal power stronger or weaker. This has the effect of blurring the images (called 'viewing windows') that are formed at the observers' eyes, as illustrated in FIGS. 4a and 4b. In this case, as the observer moves off axis, the change in brightness from the panel is improved. As the left eye moves off axis the left eye image will fade to black rather than suddenly turning to black. In addition, as the left eye image fades, the brightness of the right eye image increases to compensate. In this way, the brightness level from the panel can remain more constant.

The disadvantage of this solution is that, in order to decrease the brightness variation to a low enough level, a region is created where both left and right images are visible to the left eye (an 'image mix region'). Therefore the observer sees a double image which makes the image of poor quality in this region, and the usable viewing freedom of the display in 3D mode is reduced. The advantage is that, when the display is used in 2D mode, the brightness variations are reduced. With this design, it is not possible to create a sharp transition from the left eye image to the right eye image (the ideal case for a 3D image) and remove the brightness variation from the panel.

Another potential solution to this problem is touched on in the description of U.S. Pat. No. 7,070,278 (4 Jul. 2006). This patent suggests that the lenticular lens could be split into sections. This is shown in FIGS. 5a and 5b. Regions '1' of the lenticular are slightly offset to the left of the display whilst regions '2' are offset to the right. If the viewer happens to be looking at the display from a position slightly off axis to the left, then regions '1' will show a good bright image to the viewer. If the viewer happens to be looking at the display from a position slightly off axis to the right, then regions '2' will show a good bright image to the viewer. In this way, for a good range of head movement at least some of the display will show a good 3D image. The lenses do not need to be defocused to provide this extra head freedom so that the transition between left and right images can remain sharp with no region where a double image is visible.

The disadvantage of this system is that, when the display is viewed slightly off axis, only one of the lens regions will show an image. The other lens region will appear black. This will cause only half the brightness of the display to be seen, and worse still, only half the resolution of the display will be seen. It may also be that, when viewed from exactly on axis, regions 1 and 2 show an image so that the display is full brightness and full resolution. In this case, the resolution and brightness will vary as the user moves from side to side which could produce a noticeable and distracting image artefact.

GB 2406730 proposes a directional display in which a lenticular screen cooperates with a display device to provide multiple views. Each lenticule of the lenticular screen has elongate parallel portions with displaced centres of curvature. The lenticules are arranged such that their outer portions direct light from adjacent non-aligned pixels to the zeroth order lobe.

US 2007/0183033 proposes a backlight for use with a transmissive spatial light modulator. The backlight includes a lenticular screen having lenticules with portions of displaced centres of curvature.

U.S. Pat. No. 7,002,748 proposes a packaging sheet for providing a visual effect to attract a viewer to a package wrapped in the packaging sheet. The packaging sheet comprises a lenticular screen printed on its rear flat surface with spatially interleaved images. In one embodiment each lenticule has a middle portion of larger radius of curvature than the adjacent side portions, such that the middle portion provide a "see-through" effect in that it does not image the printed image on the rear surface of the screen but instead allows viewing of an object below the screen.

U.S. Pat. No. 6,369,949 proposes a generally similar arrangement to U.S. Pat. No. 7,002,748, in the form of a lenticular screen on whose rear flat surface spatially multiplexed images are printed.

U.S. Pat. No. 6,130,777 proposes a rear projection screen in the form of a lenticular screen laminated to a diffuser. The diffuser comprises minute features such as lenticules.

SUMMARY OF INVENTION

According to a first aspect of the invention, there is provided a multiple view display comprising a display device and a plurality of converging lenses, each lens cooperating with a respective region of the display device comprising a first sub-region for displaying part of a first image for viewing in a first viewing region and a second sub-region spaced apart in a first direction from the first sub-region and for displaying part of a second image for viewing in a second viewing region, each lens comprising first and second portions extending parallel to each other in a second direction perpendicular to the first direction and having lens centres spaced apart in the first direction, and each lens forming first and second images of the respective region of the display device, the first and second images being displaced from one another in the first direction.

The converging lenses may be disposed between the display device and the viewing windows.

According to a second aspect of the invention, there is provided a multiple view display comprising: a display device; a plurality of converging lenses, each lens cooperating with a respective region of the display device comprising a first sub-region for displaying part of a first image for viewing in a first viewing region and a second sub-region spaced apart from the first sub-region and for displaying part of a second image for viewing in a second viewing region; and an angularly dependent diffuser for passing on-axis light substantially clearly and for diffusing off-axis light propagating at more than a predetermined angle to the optical axis of the diffuser.

The foregoing and other objectives, features, and advantages of the invention will be more readily understood upon consideration of the following detailed description of the invention, taken in conjunction with the accompanying drawings.

BRIEF DESCRIPTION OF DRAWINGS

FIGS. 4a and 4b are a plan view and a cross-sectional view showing a known solution which uses defocused lenses.

FIGS. 15a and 15b are a plan view and a cross-sectional view showing the first embodiment of the invention, which uses a novel lens shape.

DESCRIPTION OF EMBODIMENTS

Preferred embodiments of the invention will now be described by way of illustration.

Embodiment 1

Figure 6:
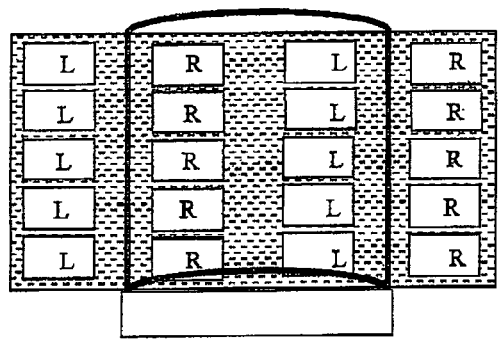
FIGS. 6a and 6b are a plan view and a cross-sectional view showing the first embodiment of the invention, which uses a novel lens shape.
FIG. 6c is an enlarged partial section view of the embodiment of FIGS. 6a and 6b.
FIG. 6d is an enlarged partial section view of a modification of the embodiment of FIGS. 6a and 6b.
FIGS. 6e, 6f and 6g are a plan view and sectional views illustrating a possible lens suitable for use in the embodiment of FIGS. 6a and 6b.
FIG. 6h shows a prediction of the optical performance of the lens design of FIGS. 6e, 6f and 6g.
Figure 6:
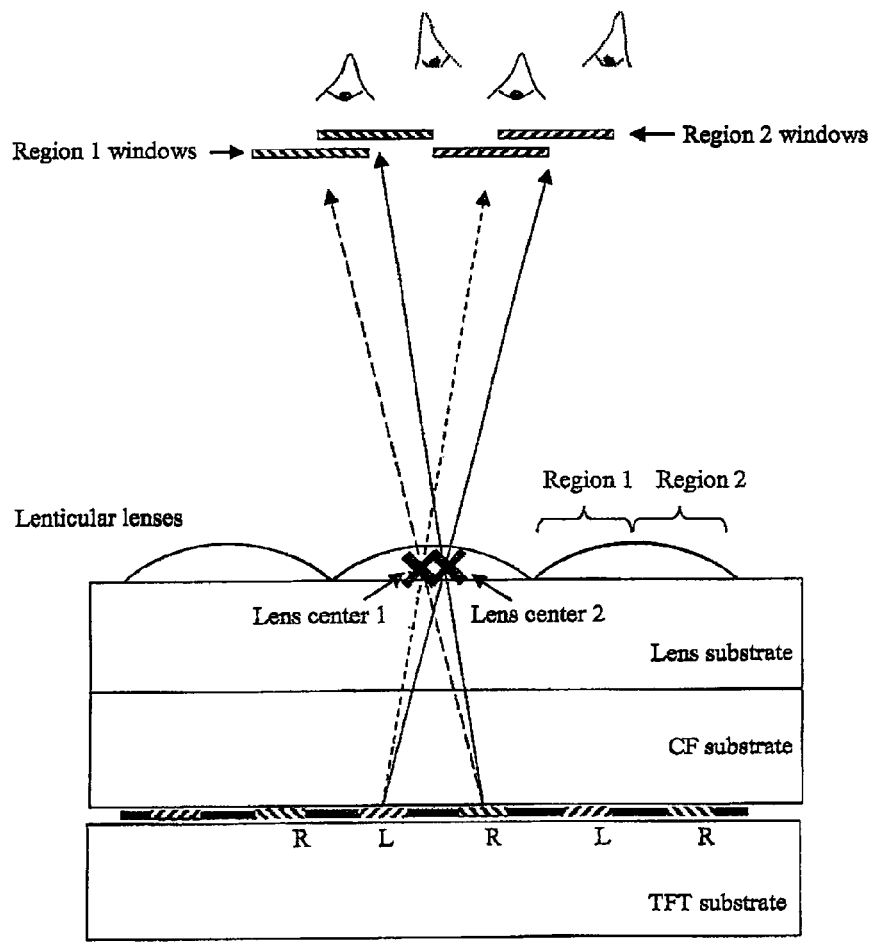

FIGS. 6a and 6b illustrates a method of improving the quality of stereoscopic 3D displays where the pixels of the display have reduced active area. FIG. 6a is a schematic plan view of a multiple view display according to one embodiment of the present invention, and FIG. 6b is a cross-section view through the display of FIG. 6a. The display has a plurality of converging lenses, here embodied as lenticular lenses, placed over a display device, in this embodiment a pixellated display device. (The display device is shown schematically as comprising an image display layer (which may be pixellated image display layer) disposed between a TFT (thin film transistor) substrate and a CF (colour filter) substrate. The detailed construction of the display device is not relevant to the present invention, and the display device will therefore not be described in detail.) The converging lenses are disposed between the display device and the viewing windows. Whereas a conventional design in this case would produce narrow viewing windows with black regions in between (FIGS. 3a and 3b), the new method spreads the viewing windows out by using a novel lens shape which creates a double image of the pixels.

The converging lenses may also be disposed between the display device and the viewing windows.

Figure 6C:
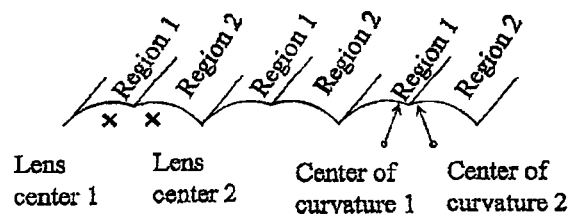

The lens shape is created such that it has two lens centres. Half of the lens (region 1) is centred around lens centre 1, and the other half of the lens (region 2) is centred around lens centre 2, as illustrated in FIG. 6c. Lens centre 1 and lens centre 2 are displaced from each other so that a double image of the pixels is produced. Region 1 images the pixels to create the 'region 1 windows', and region 2 images the pixels to create the 'region 2 windows'. The two different sets of windows are displaced from each other to spread out the images of the pixels which increases the amount of head movement that is possible. In addition, the focal power of the lens can be optimal to image windows with sharp well defined edges, so that the transition between the left and right eye windows can be sharp. There is substantially no region where left and right windows overlap, i.e. there is substantially no image mixing region. In addition, the brightness of the left and right views can remain high up to the point where the transition between left and right windows occurs. Because of these factors, the viewer may view the display from an off axis position and the quality of the 3D image is still good. The display has good 'viewing freedom'.

In more detail, each lens of the display cooperates with a respective region of the display device, the respective region comprising a first sub-region for displaying part of a first image for viewing in a first viewing region and a second sub-region spaced apart in a first direction from the first sub-region. In the embodiment of FIGS. 6a and 6b, for example, the first "sub-region" comprises part of a column of left-eye pixels (where "column refers to a display oriented as shown in FIG. 6a) for displaying part of a left-eye image for viewing in a left-eye viewing region and the second "sub-region" comprises part of a column of right-eye pixels for displaying part of a right-eye image. The first "sub-region" (ie the left-eye pixels) is spaced apart from the second sub-region (ie the right-eye pixels) in a horizontal direction (with the display oriented as shown in FIG. 6a). Each lens comprises first and second portions that extend parallel to each other in a (second) direction which is perpendicular to the (first) direction in which the first sub-region and the second sub-region are spaced apart. That is, with the display oriented as shown in FIG. 6a, the first and second portions extend parallel to each other in a vertical direction. Alternatively, with the display oriented as shown in FIG. 6b, the first "sub-region" (ie the left-eye pixels) is spaced apart from the second sub-region (ie the right-eye pixels) in a horizontal direction, and the first and second portions of a lens extend into the plane of the paper.

The first and second portions of the lens have lens centres that are spaced apart in the (first) direction in which the first sub-region and the second sub-region are spaced apart. Each lens forms first and second images of the respective region of the display device, the first and second images being displaced from one another in the first direction (so that a "double" image of the respective region of the display device is formed).

In the embodiment of FIGS. 6a and 6b the first and second portions of each lens are integral with each other. In principle, however, the first and second portions of each lens could be separate from one another.

Preferably each lens has a constant cross-sectional shape and size (as seen perpendicular to the direction in which the first and second portions extend) along its length (that is, each lens has a constant cross-sectional shape and size, perpendicular to the second direction defined above, along the second direction.

Figure 5:
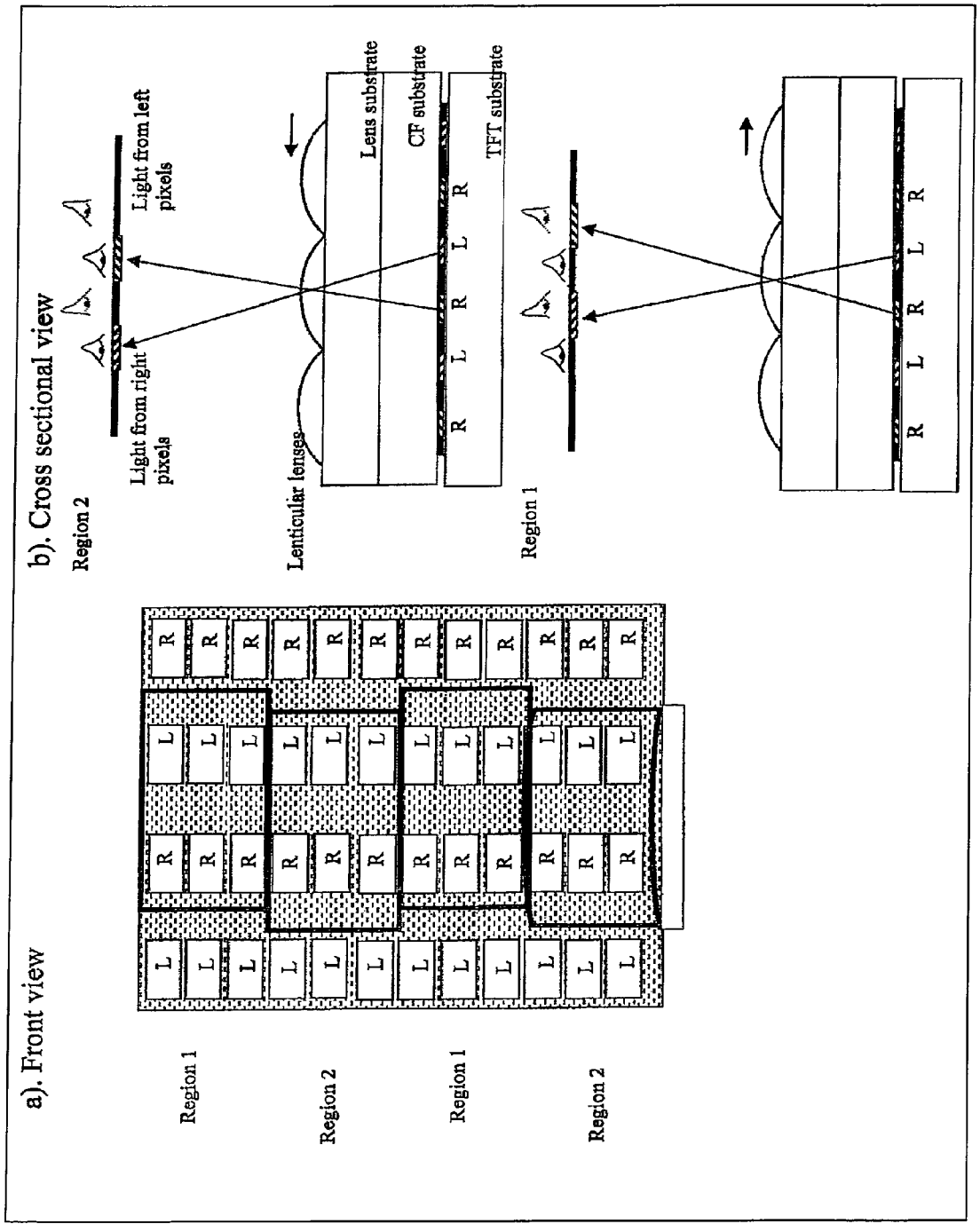
FIGS. 5a and 5b are a plan view and a cross-sectional view showing a known solution which uses offset lenses.

It is thus possible to provide a lens design which is used to create a display with wide stereoscopic viewing windows to create a good 3D image with good viewing freedom. No black regions are visible when the display is viewed off axis (unlike the design of FIGS. 3a and 3b), no region exists where an image mix is present (unlike the design of FIGS. 4a and 4b), and all the display resolution can be seen (unlike the design of FIGS. 5a and 5b). In addition this lens design should add very little to the manufacturing cost of the display since the lenses are created in the same way as for the conventional design and only the master stamp used to press the lenses would be made to a different design.

In addition this technique is applicable to other devices. For example, dual view displays create viewing windows that are widely spaced apart such that different images can be viewed by different people (GB2405542, 2 Mar. 2005). Some displays use parallax optics to direct light away from certain directions so that they do not form reflection in a car windshield, for example (GB0813088.2, 20 Jan. 2010). Some displays use combinations of these types of functionality (GB0803170.0, 26 Aug. 2009) or create multi-view 3D. All of these displays could be improved by applying the present technique to manipulate the viewing windows.

In addition the basic principles can be applied to any display type, such as liquid crystal displays (LCD), organic light emitting diode (OLED) displays, and so on.

Figure 1:
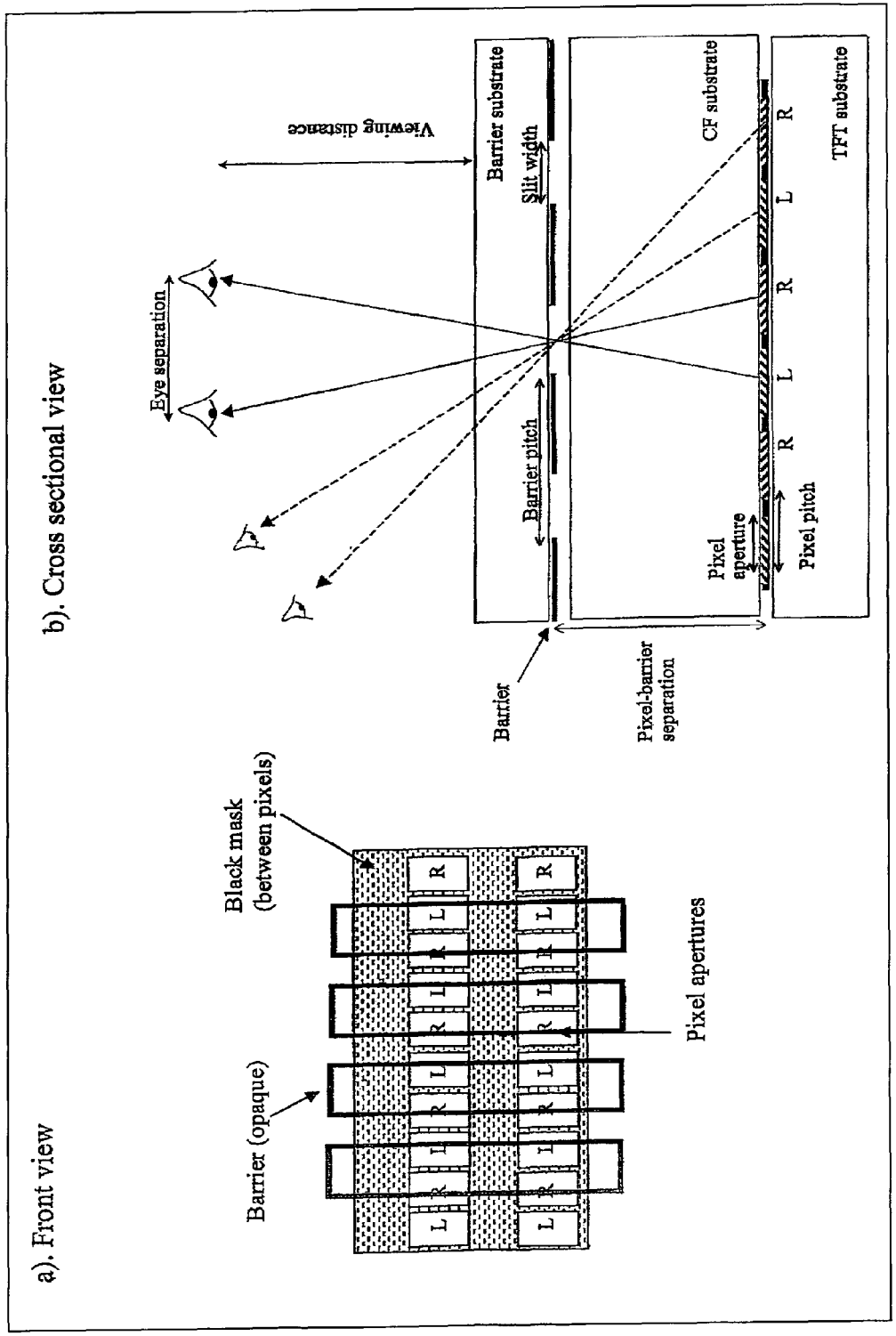
FIGS. 1a and 1b are a plan view and a cross-sectional view showing the operation of an autostereoscopic display which uses a parallax barrier.
Figure 7:
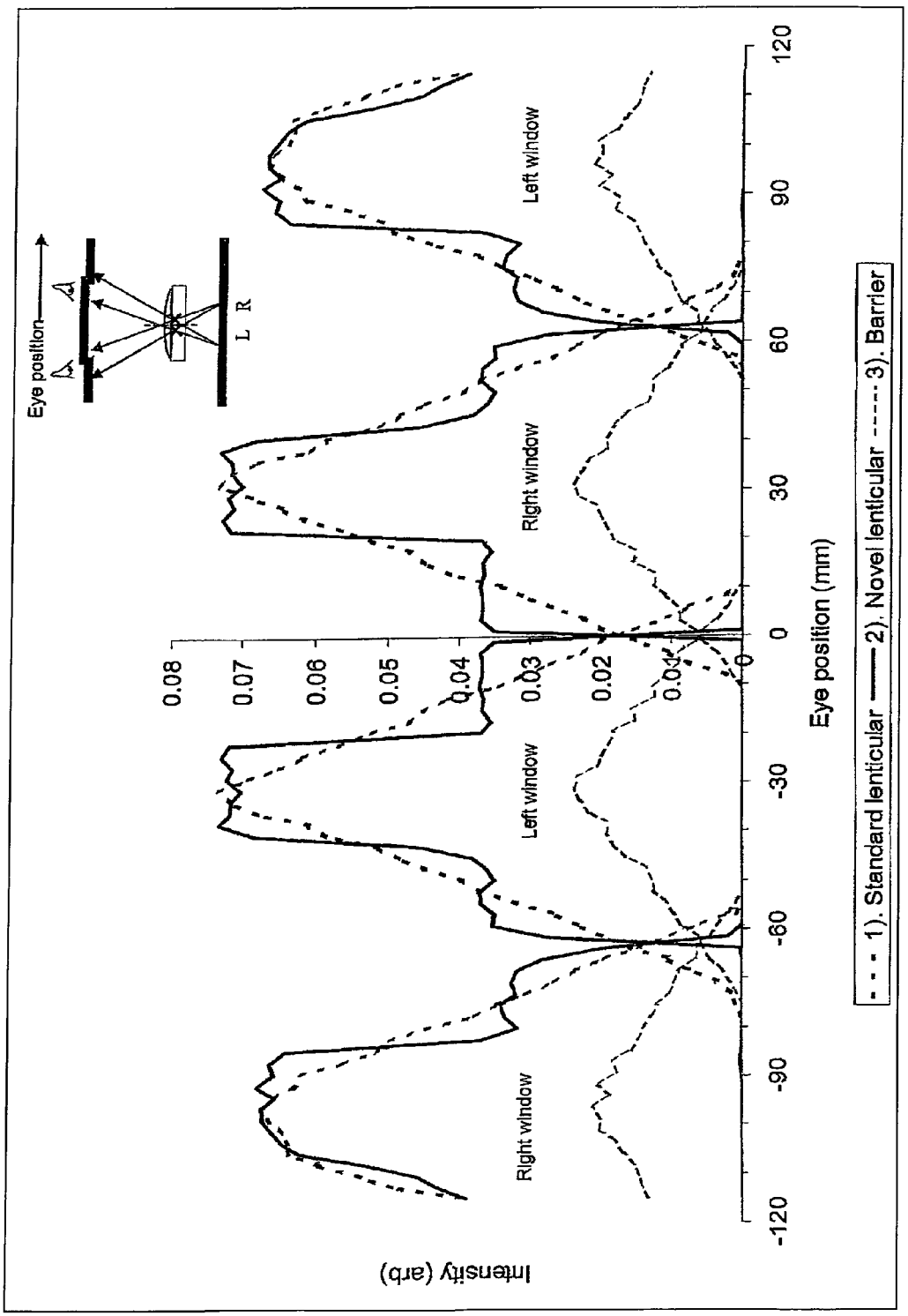
FIG. 7 shows a prediction of the optical performance of the prior art and the new design.

FIG. 7 shows a prediction of the display performance in comparison to other designs. The graph is a simulation of the optical performance of three different 3D display designs, a parallax barrier (of FIGS. 1a and 1b), a standard defocused lenticular (of FIGS. 4a and 4b), and the novel lens design (of FIGS. 6a and 6b). The simulation is based on optical ray tracing of the designs, for a display which has a pixel aperture in the horizontal direction of about 65% (i.e. similar to that of the rotated pixel design of FIGS. 3a and 3b that causes problems with the known 3D display designs).

The average eye separation for an adult is about 62 mm so, if the viewer looks at the display on axis, their left eye would be at eye position −31 mm and their right eye would be at about 31 mm.

For the parallax barrier design, the intensity observed by the viewer is lower than for the lenticular designs. This is because the parallax barrier absorbs much of the light from the panel. As the viewer moves off axis, the intensity decreases because the viewer can see less of the pixel aperture through the parallax barrier. As the right eye reaches the 10 mm position, the right eye begins to see an increasing amount of light from the left eye window, this causes the viewer to see an unpleasant image mix.

For the standard defocused lenticular, the same brightness reduction and image mixing region exist. In this case, it is because the image of the pixel aperture is blurred by the defocused lenticular lenses so that the brightness fades and the left and right pixel images overlap. Therefore the design has the same disadvantages of brightness reduction and image mixing regions.

For the novel lenticular design, the images of the pixel are sharp and so the transition between left and right images can be sharp. Therefore the user can move his right eye across to eye position 0 mm before seeing the left eye image. This design therefore provides +/−30 mm of head freedom rather than the +/−20 mm of head freedom for the known designs. Note that for the known designs the transition between left and right images could be separated from each other but this would result in intensity from the display becoming zero at eye position 0 mm which is not desirable. It can be seen that there is a step in the brightness for the novel design at about eye position 20 mm. This is due to the double image that is produced by the lens. The first image is from eye position 0 to 45 mm and the second image is from eye position 20 mm to 62 mm. The images overlap from 20 mm to 45 mm and this explains the peak in intensity in this region. This peak may be deemed beneficial, but it could also be removed as explained in embodiment 3.

Figure 6D:
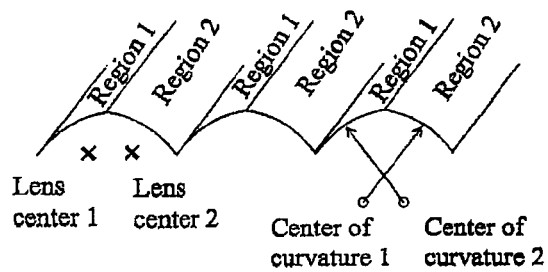
Figure 6E:
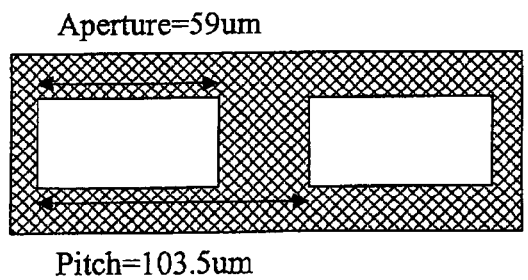
Figure 6F:
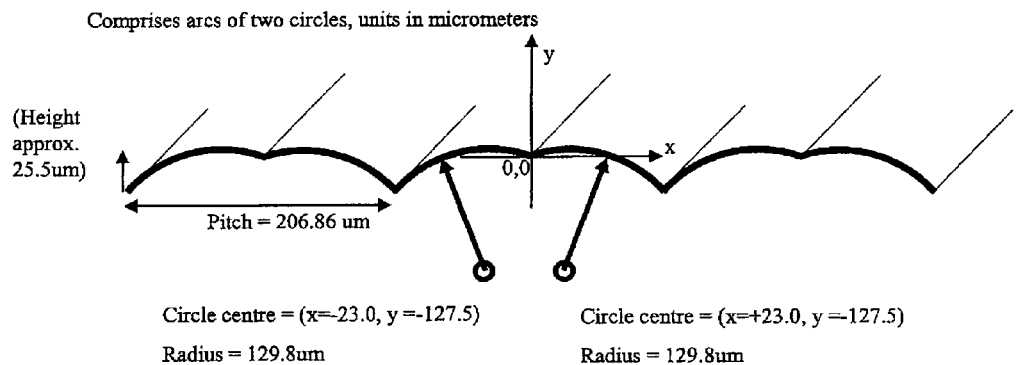
Figure 6G:
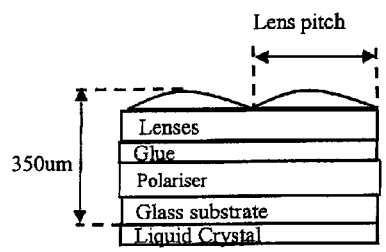

One possible lens design that is suitable for use in the embodiment of FIGS. 6a and 6b is shown in more detail in FIGS. 6e, 6f and 6g. FIG. 6e is a partial front view, and as can be seen, in this example, the pitch of the pixel columns (shown as "p" in FIG. 6a) is 103.5 µm, and the pixel aperture (shown as "a" in FIG. 6a) is 59 µm.

FIG. 6f is a partial enlarged sectional view through the display, showing the lens shape. As can be seen, the cross-section through the surface of the lens comprises arcs of two circles having centres at x=−23.0 µm, y=−127.5 µm and x=−23.0 µm, y=−127.5 µm, with each circle having a radius=129.8 µm. The width of a lens is 206.86 µm which is twice the pitch of the pixel columns so that a lens covers one column of pixels that generate a left eye view and one column of pixels that generate a right eye view. With this width, the maximum height of the lens is approximately 25.5 µm.

FIG. 6g is a cross-section through the display, showing how the lens substrate of FIG. 6b, on which the lenses are formed, is adhered to the display device by a layer of transparent glue. (Only the liquid crystal layer, the upper substrate and the upper polariser of the display device are shown for clarity, and other components such as the lower substrate of the display device are omitted from FIG. 6g.)

Figure 6H:
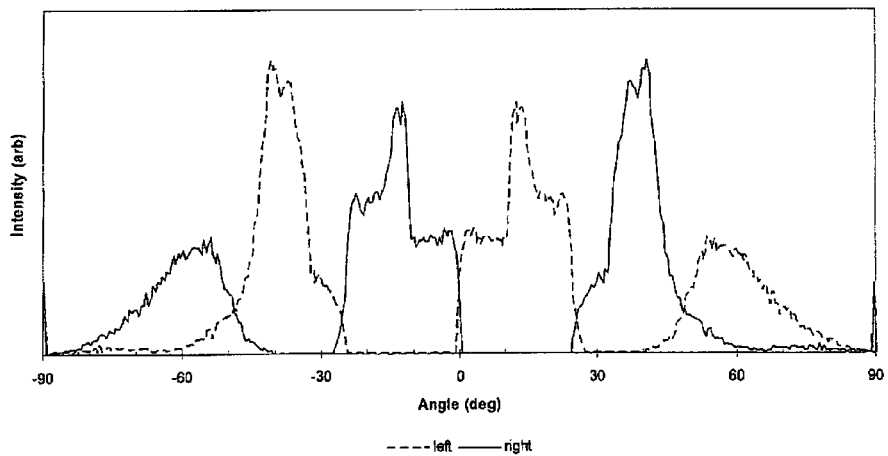

FIG. 6h shows a simulation of the optical performance of a display having the lens design of FIGS. 6e and 6f). As in the case of FIG. 7, the lens produces two separated images of the left pixel column and two separated images of the right pixel column. The images of the pixels are sharp and so the transition between left and right images can be sharp.

Other embodiments will now be described. Features of an embodiment that are the same as, or similar, to those of embodiment 1 will not be described again in detail.

Embodiment 2

In embodiment 1 region 1 of the lens has a lens centre that is displaced to the left (lens centre 1), and region 2 has a lens centre displaced to the right (lens centre 2). This produces a lens that has a cross section as sketched in FIG. 6c.

An alternative design exists where region 1 has a lens centre displaced to the right (lens centre 2), and region 2 has a lens centre displaced to the left (lens centre 1). This produces a lens that has a cross section as sketched in FIG. 6d. This alternative design may be easier to make.

Embodiment 3

As mentioned in embodiment 1, where the double images overlap, there is a peak in brightness. One solution to this is to arrange the first and second sub-regions of the display device to be evenly spaced in the first direction (ie, in the direction in which they are spaced from one another) with each of the first and second sub-regions having an aperture in the first direction that is substantially equal to half the pitch of the first and second sub-regions in the first direction. For a display oriented as shown in FIG. 6a, this would mean making the horizontal pixel aperture substantially 50% of the horizontal pixel pitch. Then the double images could be adjusted to be formed from 0 mm to 31 mm eye position and 31 mm to 62 mm eye position. In this way, the double images would be side by side and would not overlap. Therefore the brightness would be uniform across all eye positions.

Alternatively, the aperture of the pixel in the vertical direction could be tapered in some regions so that the peak in brightness is gradual rather than sharp.

Embodiment 4

As is well known a spherical lens surface is not the optimal shape of lens for imaging, and aspheric designs are often used to minimise aberrations. The same is true for cylindrical lenses. Each region of this design could be made with an 'a-cylindrical' shape to minimise aberrations with the lens still using displaced lens centres to create a double image.

This lens shape may need to be adjusted subtly across the display for best performance.

Embodiment 5

In the previous embodiments, it has been said that the lens produces a double image due to the two lens portions having different lens centres 1,2. The invention is not however limited to a lens that has exactly two lens portions and that produces a double image of the respective portion of the display device. In a display according to a further embodiment of the invention each lens may have at least one further portion that extends parallel to the first and second portions in the second direction as defined above and that has a lens centre that is spaced from the lens centres of the first and second portions. The or each further portion of the lens forms a further image of the respective region of the display device, the first and second images and the or each further image being displaced from one another in the first direction.

Figure 10:
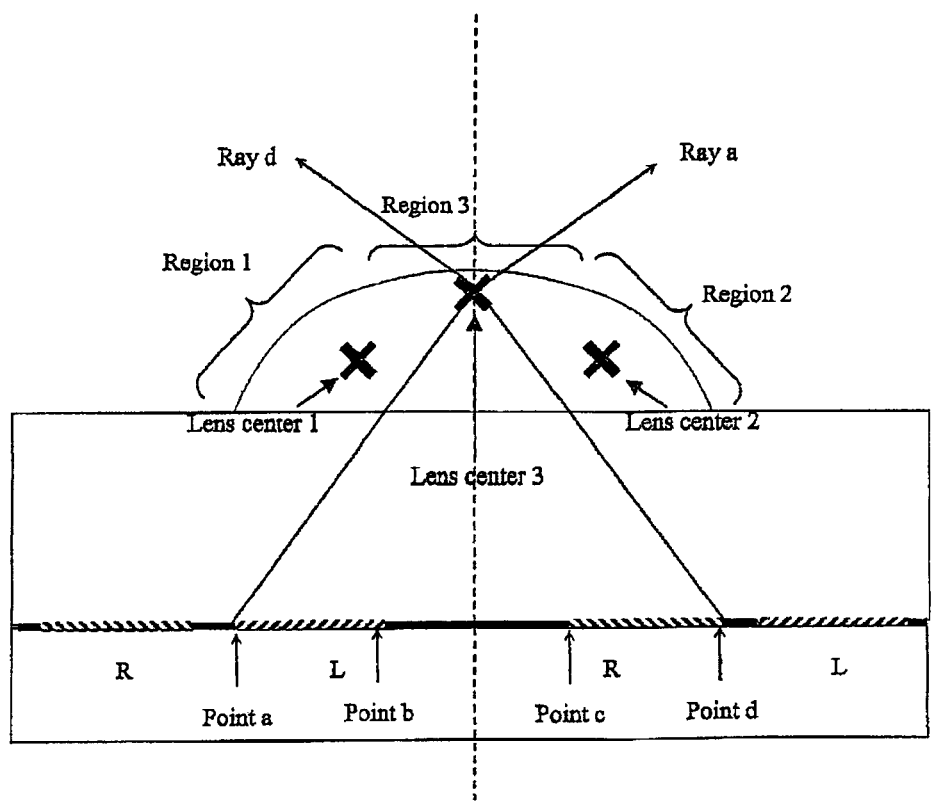
FIG. 10 shows a dual view display using a novel lens design.

That is, in the invention, the lens could be split into any number of regions, for example three regions which create three displaced images of the pixel, into four regions which create four displaced images of the pixel, etc. Note that these regions do not need to be of equal sizes if the intensity of the images needed to be varied. An embodiment of this type is shown in FIG. 10 and described in more detail hereinafter with reference to embodiment 9.

Embodiment 6

Figure 12:
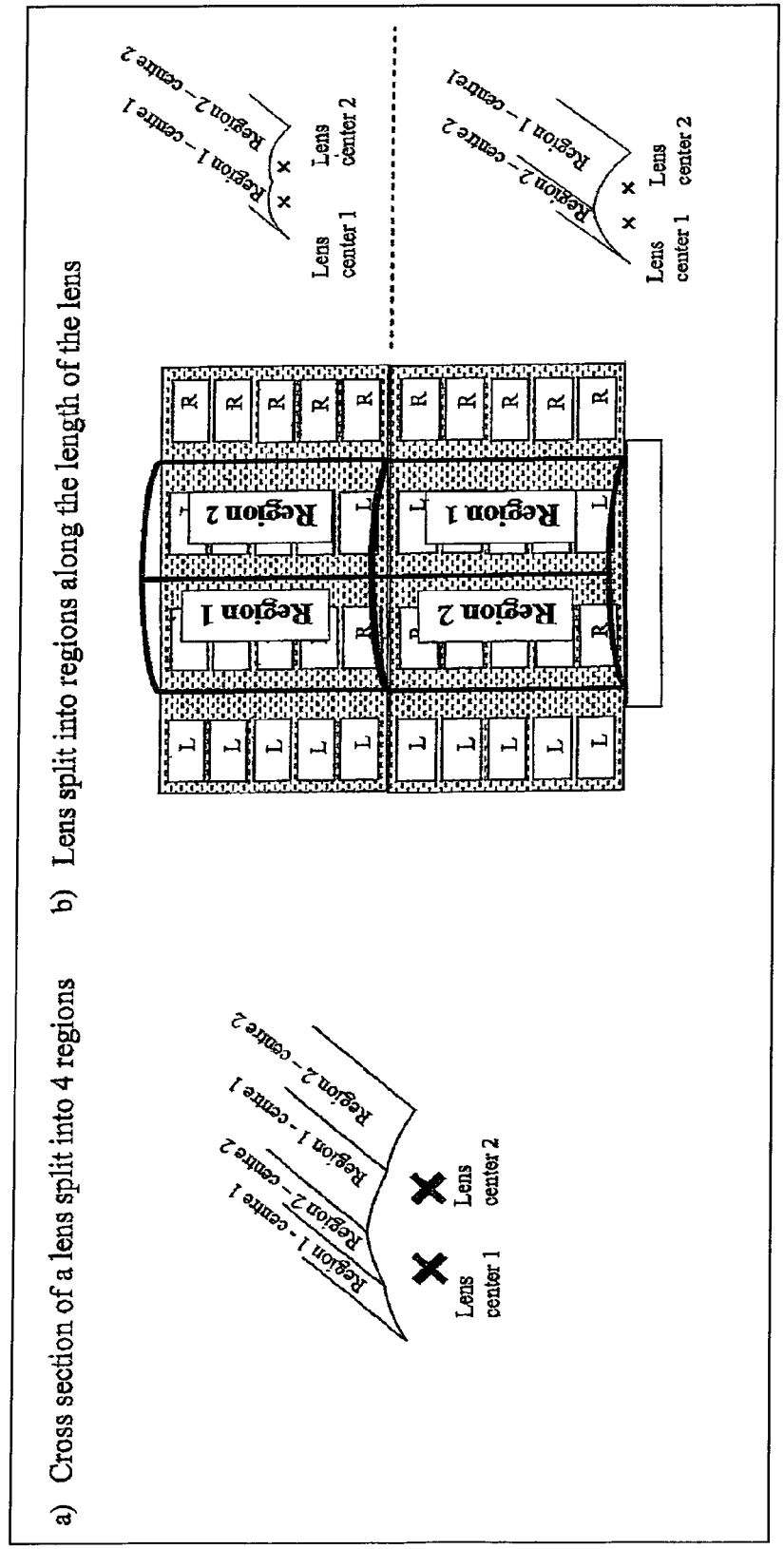
FIGS. 12a and 12b illustrate ways in which a lens may be split into different regions.

The lens regions may be distributed in any pattern over the display. For example, in embodiment 1, each lens rests above a left and a right pixel and the lens is split so half is region 1 and half is region 2. It would also be possible to split the lens more finely. For example the lens could be split into quarters where quarter 1 is regions 1, quarter 2 is region 2, quarter 3 is region 1, and quarter 4 is region 2. An example of this is shown in FIG. 12*a*.

In embodiment 1, each row of lenses alternates between region 1 and 2, and each region extends for the entire column length of the lenticular. It might be desirable to alternate between region 1 and 2 down the columns as well as the rows as this may make the regions less visible. An example of this is shown in FIG. 12*b*.

Embodiment 7

Figure 3:
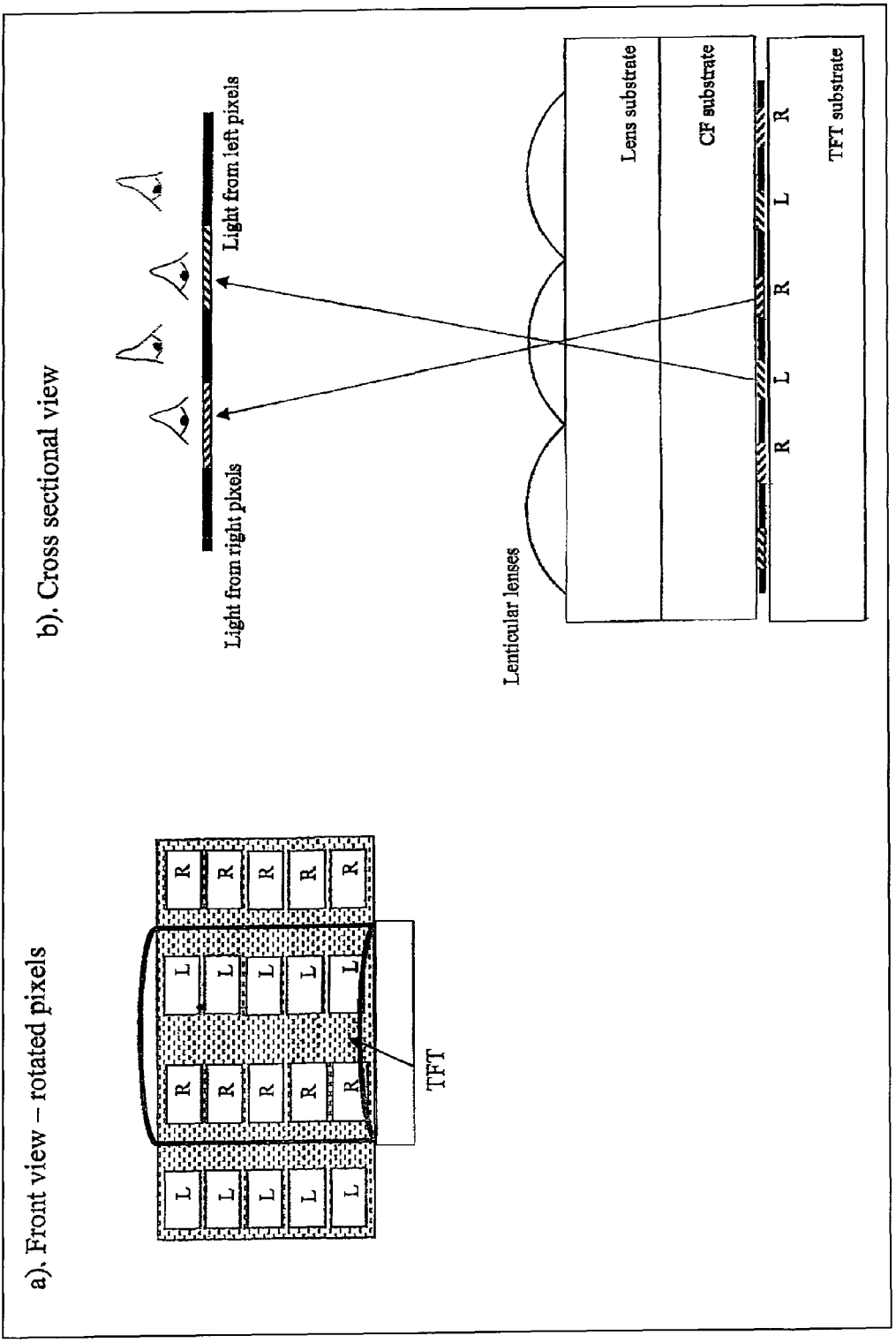
FIGS. 3a and 3b are a plan view and a cross-sectional view showing the problems that arises when using a standard lenticular lens and pixels with small active area.
Figure 13:
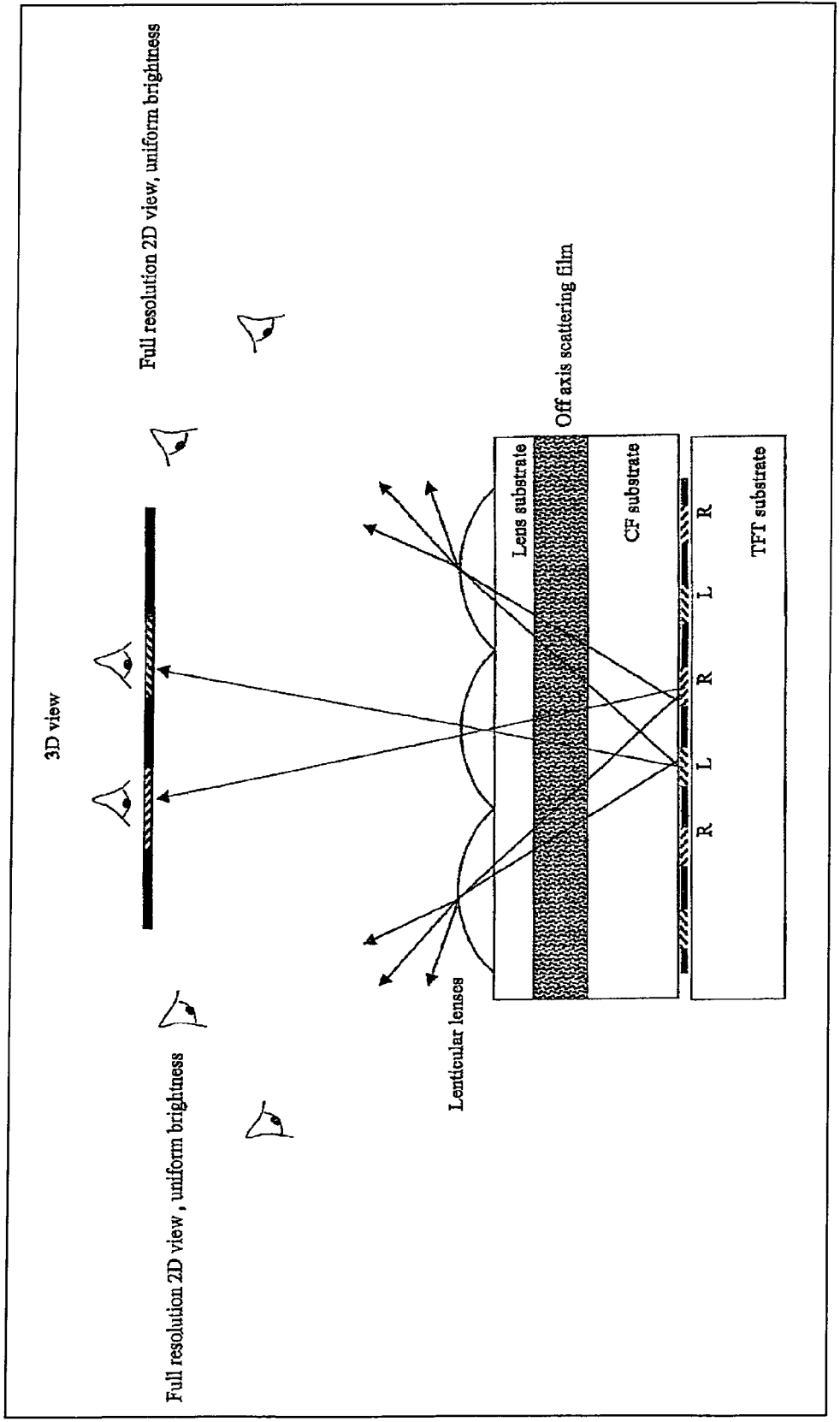
FIG. 13 shows a cross sectional diagram showing how an off axis scatter could be used in the system.

It may be difficult to create lenses that function well when the display is viewed at high angles to the normal of the display (for example greater than 30 degrees). In this case, it might be useful to add to the display an angularly dependant diffuser that lets light on axis pass clearly, whilst off-axis light, for example light at high angles or off-axis light propagating at more than a predetermined angle to the axis of the diffuser, is diffused. A diffuser suitable for this purpose is known as "lumisty"™ directional scattering film available from Sumitomo Chemical Co. Limited. Information about this film is available in 'Proceedings of the International MultiConference of Engineers and Computer Scientists 2010 Vol. I, IMECS 2010, Mar. 17-19, 2010, Hong Kong, Tabletop Life Review Therapy System Using Olfactory Display for Presenting Flavor, by Masahiro Nishiguchi, Kunio Sakamoto, Shusaku Nomura, Tetsuya Hirotomi, Kuninori Shiwaku and Masahito Hirakawa'. Therefore when the display is viewed at high angles, the directionality of the light created by the lenses is completely diffused so that a useful 2D image is created. FIG. 13 is a sectional view through a multiple view display according to this embodiment of the invention. As shown in FIG. 3, an off-axis scattering film is disposed between the pixels and the lenticular lenses.

Embodiment 8

Some 3D displays are designed so that they can be used in landscape or portrait orientations. The novel lens shape may be used to help in this situation also.

There are many designs that may be used to create a 3D display that operates in landscape and portrait orientation (one example is given in GB2415850, 4 Jan. 2006), below is a description of few example designs.

Figure 8:
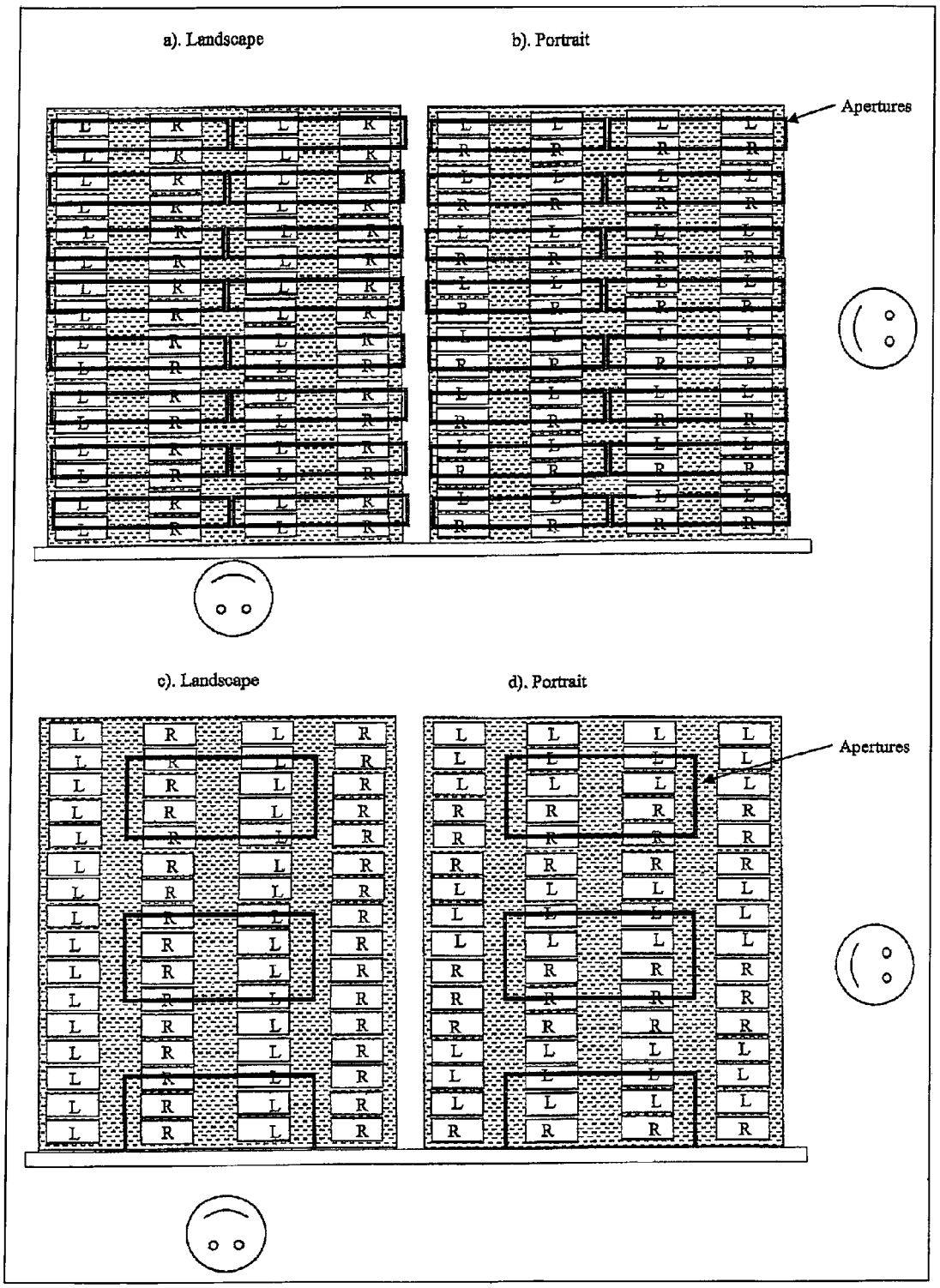
FIGS. 8a and 8b, and FIGS. 8c and 8d, show embodiments of the invention which may be used in landscape or portrait orientation.

FIG. 8*a* shows a panel being viewed in a landscape orientation and in this orientation the panel has 'rotated pixels'. The columns of pixels alternate between left and right image pixels. The lenticular lens design can be the same as embodiment 1 to provide good 3D viewing windows. However, in order to make the design work in a portrait orientation, apertures have been added only in certain regions. In particular, when considered in the landscape orientation, the lenses do not extend throughout the length of the pixel columns. Instead, they are divided into spaced-apart lenses which are separated "vertically" from each other by opaque "horizontal" strips, for example formed by blank masking. In the portrait orientation, the lens array acts as a parallax barrier with the lenses forming the slits. The opaque regions between the lenses are shown as being clear in FIGS. 8*a* to 8*d* for clarity of illustration.

In the portrait orientation (FIG. 8*b*), the left and right pixels are reconfigured so that the columns (previously rows in the landscape orientation) now alternate between left and right image pixels. The lenticular lens does not provide any 3D effect in this orientation; the 3D effect is generated by the aperture in the same way as the parallax barrier generates 3D windows in FIG. 1. Therefore the display can be used to show stereoscopic images in the landscape and portrait orientation.

Similarly, instead of using apertures in the portrait orientation, a lenticular lens system could be used. However, the shape of the lenticular lens system in the portrait and landscape modes would ideally be different and a compromise shape that serves both purposes may be needed. A spherical aperture may be better in this instance.

It is common that pixels in the horizontal and vertical directions have different pitches. Typically, in the portrait orientation of FIG. 8*b*, the pixel pitch is 3 times smaller than that for the landscape orientation and pixels cycle between red, green and blue in colour. Therefore, in the portrait configuration of FIG. 8*b*, the windows would be best viewed three times closer than in the landscape orientation. A solution to this problem is to configure the left and right image pixels in groups of three so the columns cycle through a sequence of left, left, left, right, right, right image pixels as shown in FIGS. 8*c* and 8*d*. The apertures for the portrait barrier would ideally have a width of 3 pixels so that an equal amount of red, green and blue image are always visible.

Similarly grouping of two pixels (left, left, right, right . . . ), or three pixels and a gap (left, left, left, right, right, right, black . . . ), or four pixels (left, left, left, left, right, right, right, right), and so on, could be used with a corresponding aperture pitch. Again an aperture width of three pixels would be beneficial.

Again, lenticular lenses could be used in the landscape and portrait orientation with compromised shape, with spherical apertures, with the novel lens centre design incorporated into the landscape and portrait modes as necessary. A combination of lens and apertures could be used for the design of the landscape or the portrait parallax optic.

For example, as shown in FIGS. 8*c* and 8*d*, the lenses are arranged as a two-dimensional array with the gaps surrounding the lenses being opaque. The lens array provides parallax in both the landscape orientation and the portrait orientation. The lenses may have different radii of curvature vertically and horizontally (with the orientations shown in FIGS. 8*c* and 8*d*) for at least partially determining the optimum viewing distances in the different orientations. In this case, instead of the lens regions having spherically curved surfaces, the shape of the curved surfaces of the lens regions may be sections of a torus, for example taken from a region at or adjacent the outer rim of a torus.

Embodiment 9

This new lens is particularly useful for dual view displays where the angle of separation between the left and right images is large (for example 60 degrees). This case is explained by way of example in the following.

Let us suppose that we would like to create a dual view display that shows a left view from −55 to −10 degrees and a right view from 10 to 55 degrees. Within these angular ranges only the appropriate view should be visible, with no crosstalk from the other view, and at a reasonable intensity.

Figure 2:
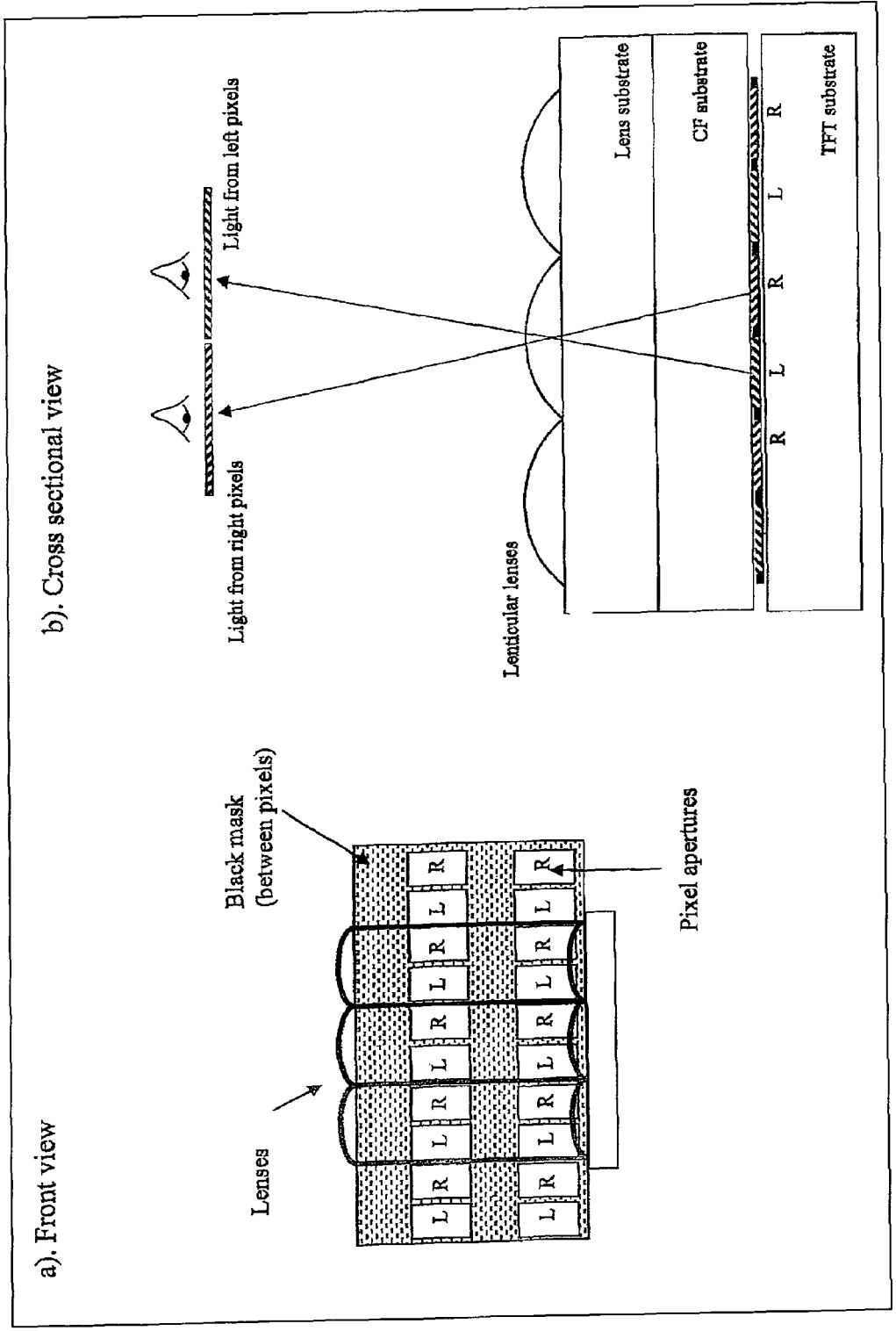
FIGS. 2a and 2b are a plan view and a cross-sectional view showing the operation of an autostereoscopic display which uses lenticular lenses.
Figure 9:
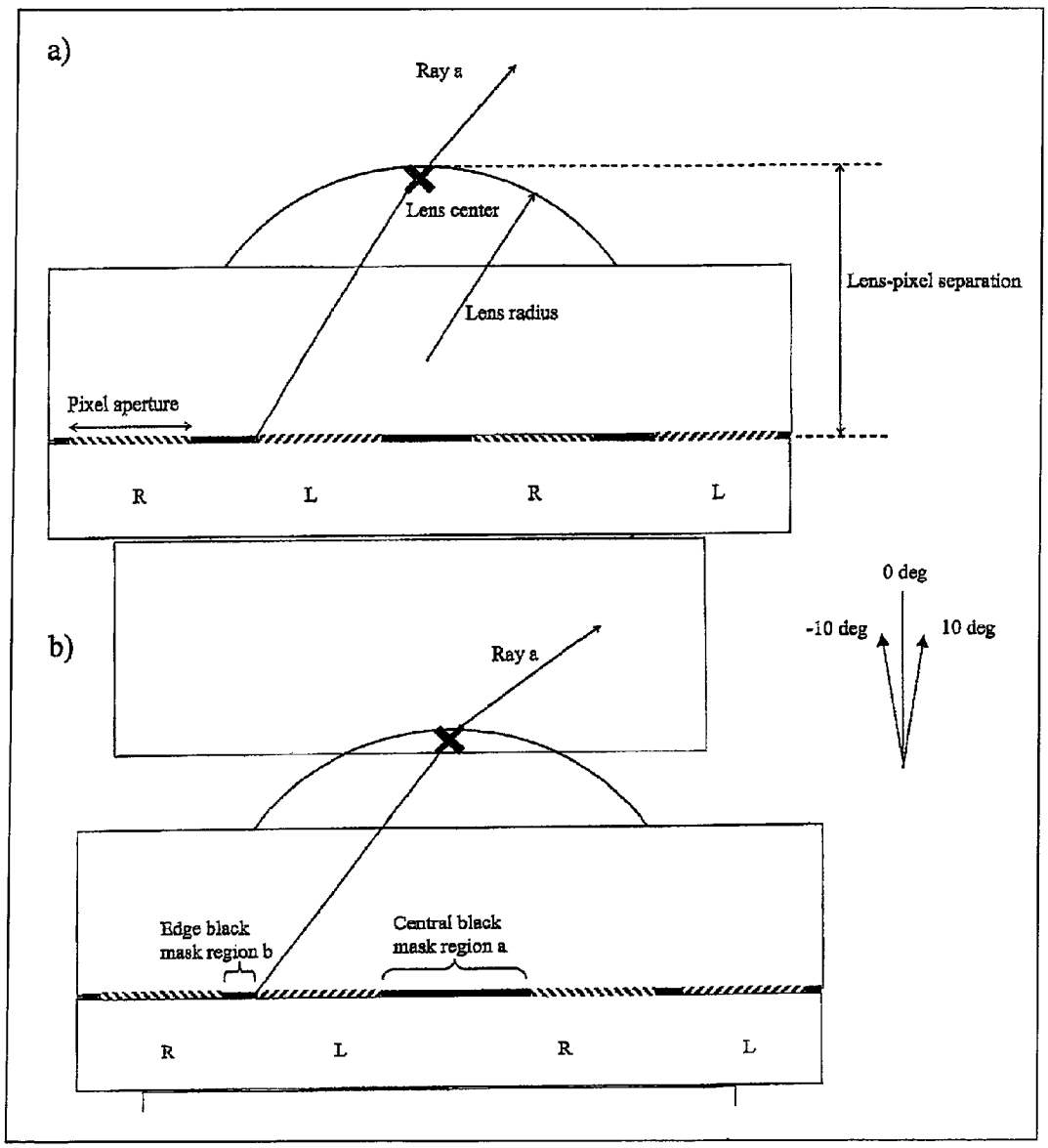
FIG. 9a shows a dual view display with lenticular lenses.
FIG. 9b shows a dual view display with lenticular lenses and asymmetric pixels.

Previous literature would suggest that a cylindrical lens might be used similar to that of FIGS. 2*a* and 2*b*. However, the lens to pixel separation of a known arrangement as shown in FIG. 9*a* would be reduced to spread the left and right views out to higher angles. Ray 'a' in FIG. 9*a* produces the widest angle ray from the right view and this needs to go to 55 degrees. If the lens-pixel separation is too far then ray 'a' will go to angles less than 55 degrees. If the separation of the lens is too close then the focal length of the lens needs to be very short to focus on the pixels.

The radius of curvature of the lens can be reduced to decrease the focal length. The smallest focal length will be produced if the lens radius is smaller than half the lens pitch such that there are no gaps between the lenses, for example as disclosed in GB2405542 (2 Aug. 2006). In this design, the regions between the lenses are required to be made opaque, which increases the manufacturing complexity.

If the gaps are not to be used between the lenses the next smallest focal length will be produced by the use of a radius that is half the lens pitch resulting in half cylinder lens shapes, however when using conventional lens materials of refractive index 1.5 in air, even the focal length of a half cylinder is not short enough and the pixels are blurred. The result of this is that the left view spreads to angles greater than 10 degrees into the right view and the specifications of the display are not met.

This problem may be helped by reducing the pixel apertures so that the left and right views are more separated and can suffer more blur before they spread into one another. In the best case (with reduced pixel apertures and a lens-pixel separation just large enough so that the left view just does not spread past 10 degrees), the views would only be visible between about 10 to 43 degrees and, because the pixel apertures are reduced, the brightness will be poor. Therefore this design cannot meet the specification.

A partial solution to this problem is illustrated in FIG. 9b, which shows an arrangement of the type disclosed in GB2422737. A display panel with asymmetric pixels is used. During the design of this panel, the central black mask region 'a', and the edge black mask region 'b' can be adjusted. It is advantageous to reduce the width of region 'b' so that the left and right views are spread to wider angles. It is advantageous to increase the width of the region 'a' so that the left and right views are more separated, and can suffer more blur before they spread into each other. A design can be achieved with the asymmetric pixel design and the cylindrical lens design whereby the 10 to 55 degree viewing freedom specification is achieved.

This design has the advantage that the lenses can be cylindrical which improves the ease of manufacture, but it has the disadvantage that the pixel apertures need to be reduced considerably so that the display brightness is reduced and the brightness drops off as a viewer approaches the on axis viewing position.

The novel lens design described herein can be used to provide a better solution to this problem. The following text describes how it may be designed.

We will assume that we can use asymmetric pixels and a novel lens shape. The question is then what is the best design for the lens shape, lens position, and the pixels.

We will consider here that the design must be symmetrical about the dotted line in FIG. 10 so the display works the same for the left and the right views.

In order to meet the specifications, light from point 'b' must be refracted to an angle greater than −10 degrees, and light from point 'a' must be refracted to at an angle that is at least 55 degrees. If this is true then all light from the pixel should be refracted somewhere between −10 and 55 degrees. By symmetry the light from the other pixel will be refracted from −55 to 10 degrees and the specification will be met.

In addition it will be easier to focus on the pixels if the lens is positioned as far away as possible from the pixels.

Firstly we will consider what the best lens design is near the centre of the lens for light from points 'a' and 'd'. Light from these points should be refracted to 55 and −55 degrees. The angle of refraction will depend on location of the lens centre for this region of the lens, the position of the lens surface and the width of the edge black mask region.

If the lens centre was moved to the right of the diagram away from point 'b', then the lens would refract light from point 'b' to higher angles. This could be advantageous since it could allow a larger lens-pixel separation to be used. However if the lens centre is moved to the right it would also refract light from point 'd' to lower angles. Therefore moving the lens centre would not help the specifications to be met. The lens centre for the centre of the lens should be in the centre of the left and the right pixels, and so the central part of the lens should be flat. The region 3 may even have plane parallel opposite surfaces such that it is neither converging nor diverging (infinite radius of curvature or zero optical power).

Points 'a' and 'd' should be located in a position as far from the dotted line in the diagram as possible as this will increase the angle at which the rays 'a' and 'd' are refracted. Therefore the width of the edge black mask region should be as small as possible.

The lens-pixel separation should be as large as possible, whilst still allowing ray 'a' to be refracted to 55 degrees.

Note that when considering light from points 'b' and 'c', the lens separation could be any distance yet light from these points would still be refracted to angles that do not infringe the specifications. The characteristics of the lens in region 3 are dictated by the requirement that points 'a' and 'd' are refracted to 55 degrees.

The curvature of region 3 should be such that any ray from point 'a' hitting the left hand side of region 3 will be refracted to at least 55 degrees. The curvature of the lens in this region can be minimised if these rays are refracted exactly to 55 degrees. This helps the design because the lens surface is kept as far from the pixels as possible.

Substantially, region 3 is adequate up to the position where light from point 'b' is not refracted enough to be directed to angles greater than −10 degrees. At this point the curvature of the lens must be increased so that this light is bent to an angle greater than −10 degrees. In the best case the curvature of the lens is such that light is bent to exactly −10 degrees. This keeps the curvature of the lens as shallow as possible and therefore the lens is kept as far from the pixels as possible.

It may be that at the edge of the lens light from point 'b' cannot be refracted to −10 degrees regardless of the angle of the lens curvature, because the amount of refraction required is too great. In this case the width of the central black mask region can be increased to reduce the amount of refraction that is required.

Substantially, region 1 has a lens centre that is displaced −10 degrees from point 'b', and a focal length that focuses on a point 'b'.

By symmetry region 2 has a lens centre that is displaced +10 degrees from point 'c', and a focal length that focuses on point 'c'.

Where the region 3 has a finite radius of curvature, the focal planes of regions 1, 2 and 3 preferably coincide with the plane containing the pixels (the focal length of the region may be different from that of the each of regions 1, 2).

The word "substantially" is used in the description of the lens centres and the focal lengths because in the ideal case the curvatures of each region are aspheric in order to provide the best focus for the specific points mentioned, and in addition small variations in the precise location of the focal length and lens centres are possible in the design. For example region 3 may be made as a flat region for ease of manufacture (so that its focal length is infinite).

In a lenticular multi-view display some crosstalk may be created by light that refracts inappropriately at the joins between lenses, perhaps due to imperfect manufacture. It may help to reduce the crosstalk from these joins by using an opaque material to block this light. This is of particular importance for dual view displays.

Figure 11:
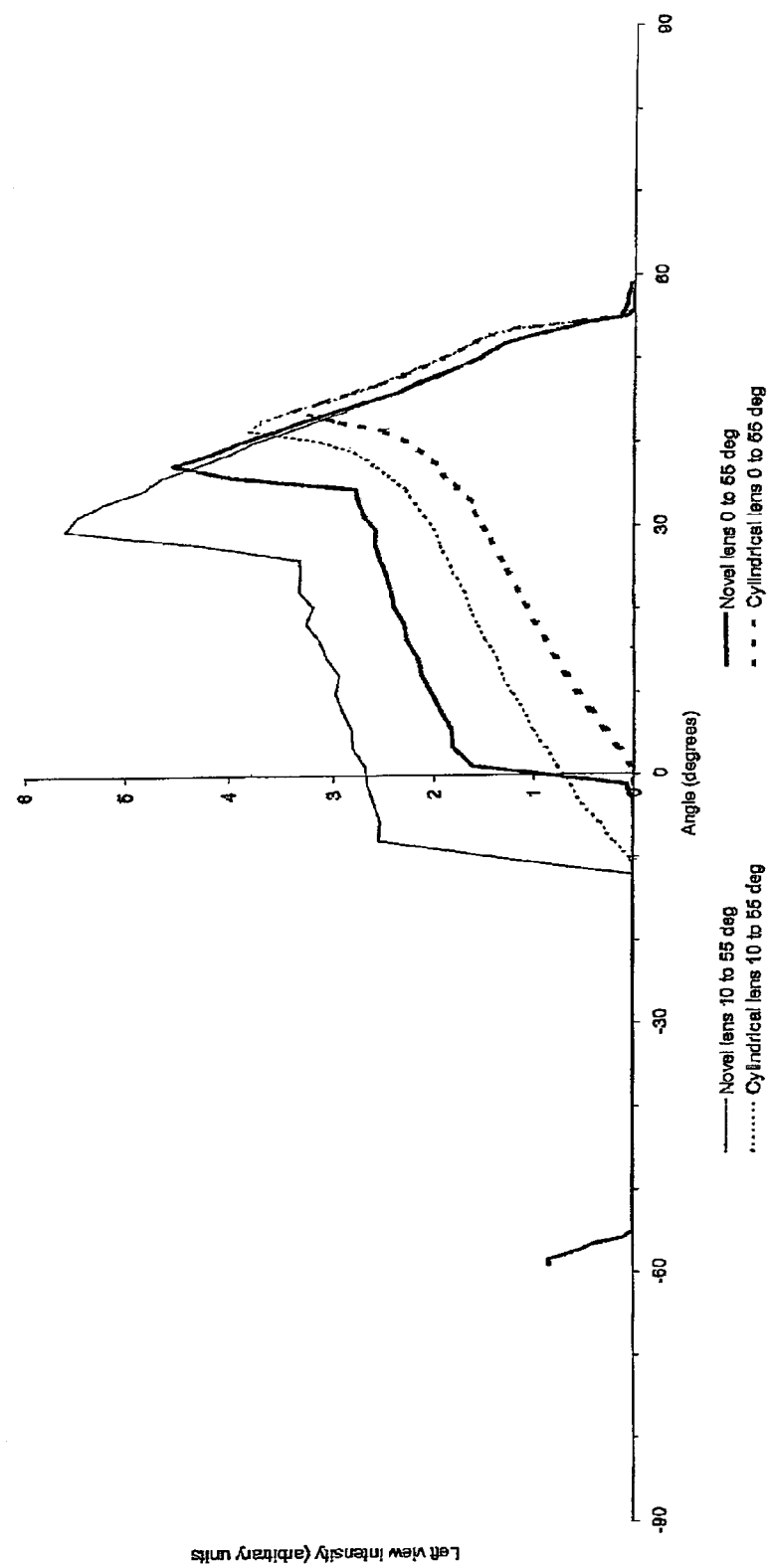
FIG. 11 shows a comparison of performance between the standard lenticular lenses and the novel lenses for dual view displays.

FIG. 11 shows a simulation of this design compared with the best spherical lens design using asymmetric pixels. Two cases are shown, one where the viewing windows are from 10 to 55 degrees and the other where the viewing windows are from 0 to 55 degrees. In both cases the use of the novel lens design produces more than twice the brightness than the spherical design. This will result in the display being brighter, or a display with the same brightness that requires less power. A further advantage exists in the 0 to 55 degrees design in that the transition between the left and right images is sharper. Rather than the gradual fade to zero intensity and a gradual increase in intensity with angle as left view changes to right view in the cylindrical design, the change between left and right view is swift in the novel lens design. This is desirable for a dual view display, and in addition it could allow a dual view display to be used as a stereoscopic 3D display because the transition between left and right views is sharp enough that one eye can be positioned in each view.

A similar design principle may be followed to design a lens that operates lens face down (in comparison with the previous description which operates with the lens face up towards the viewer). In this case it is likely that the central region of the lens will have off axis lens centres for directing the light from points 'b' and 'c', and the region at the edge of the lens will need to have a steeper curvature to direct light from point 'a' to higher angles.

Embodiment 10

The lenses of embodiment 9 are optimised to give the maximum brightness that still meets the head freedom requirements (e.g. 10 to 55 degrees). FIG. 11 shows a graph of the simulated performance of the system. It can be seen that the brightness is not uniform with angle. For example the brightness between approximately 26 to 40 degrees is particularly higher than at other angles. It might be preferable that the brightness remains more constant with angle.

This could be achieved by optimising the lenses by changing the lens design to adjust brightness uniformity (for example changing the sizes and shapes of the different lens regions).

Figure 14:
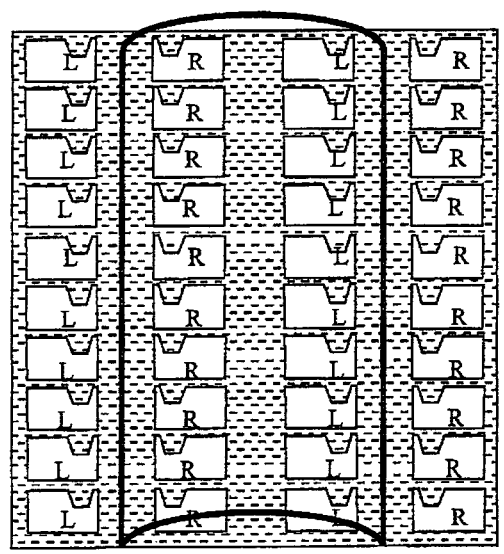
FIG. 14 shows modified pixel apertures to increase angular brightness uniformity.

This could also be achieved by adjusting the shapes of the pixel apertures, so that a pixel has an edge adapted to control brightness of light from each of the first and second sub-regions. An example design is shown in FIG. 14. The vertical aperture near the edges of the pixels has been reduced. Since the light from near the edges of the pixels is mostly directed out to higher angles (e.g. 26 to 40 degrees), reducing the vertical aperture here will primarily reduce the brightness in the range 26 to 40 degrees without significantly affecting the brightness of the display at other angles. In this way the brightness can be optimised to be more uniform with angle.

Embodiment 11

The invention has been described above with reference to displays that generate two viewing windows, for example one in which the display device displays columns of pixels that display a view intended for the left eye of a viewer and columns of pixels that display a view intended for the right eye of a viewer with the two images being directed into respective left eye and right eye viewing windows. However some displays create more than two viewing windows—that is to say, instead of creating one left view and one right view, more than two views are created. As an example a display may create 16 views each showing a different perspective of the image.

The invention may be applied to such a display that generates more than two viewing windows. For example the embodiments described above may be modified to be applicable to the example of a display that creates 16 views each showing a different perspective of the image—in this case each lens would have a pitch substantially equal to that of 16 pixels.

FIGS. 15a and 15b show a display according to a further embodiment of the invention, in which the display device creates 4 views. In this example, as shown in FIG. 15a, the display device displays first columns of pixels (labelled 1) that display a first view, second columns of pixels (labelled 2) that display a second view, third columns of pixels (labelled 3) that display a third view and fourth columns of pixels (labelled 4) that display a fourth view. As indicated in FIG. 15a, a lens extends over one first column of pixels, one second column of pixels, one third column of pixels and one fourth column of pixels.

As shown in FIG. 15b, which is a cross-section through the display and which corresponds generally to FIG. 6b, the lens design of the invention can be used to create double images of each of the 4 views, with the two images of each view being displaced from one another so that, as in previous embodiments, the brightness uniformity can be improved and the transition between the views can be made sharper.

The lens may have a shape as described in any embodiment above, for example a shape similar to that of FIG. 6c or 6f, or a shape similar to that of FIG. 6d.

It should be noted that embodiment 5, in which each lens produces three or more separated images, may also be applied to a display that creates more than two views.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A multiple view display comprising:
a display device having a planar pixel plane and a plurality of converging lenses, each lens cooperating with a respective region of the display device comprising a first sub-region for displaying part of a first image for viewing in a first viewing region and a second sub-region spaced apart in a first direction from the first sub-region and for displaying part of a second image for viewing in a second viewing region, each lens comprising first and second portions extending parallel to each other in a second direction perpendicular to the first direction and having lens centres spaced apart in the first direction, and each lens forming first and second images of the respective region of the display device, the first and second images being displaced from one another in the first direction;
wherein the first and second portions of each lens comprise first and second curved upper surfaces, respectively, on the surfaces of the lens opposite the pixel plane, and wherein the first and second curved upper surfaces of each lens are curved and do not have a flat portion, and wherein each of the first and second curved upper surfaces of each lens define a respective apex so that each lens has two apices, and wherein a detent in each lens defined where the first and second curved upper surfaces of each lens meet is at a different elevation than is a detent between adjacent lenses; and wherein the plurality of converging lenses are located on a viewer side of a liquid crystal layer of the display device, so that the lenses are to be located between the liquid crystal layer and a viewer of the display device.

2. A display as claimed in claim 1, in which the first and second portions of each lens are integral with each other.

3. A display as claimed in claim 1, in which each lens has a constant cross-sectional shape and size, perpendicular to the second direction, along the second direction.

4. A display as claimed in claim 3, in which each of the first and second portions is part-cylindrical.

5. A display as claimed in claim 1, in which the lenses are arranged as a two dimensional array.

6. A display as claimed in claim 5, in which each of the first and second portions is spherical or toroidal.

7. A display as claimed in claim 1, in which the lenses are separated from each other by opaque regions.

8. A display as claimed in claim 1, in which each lens comprises at least one further portion extending parallel to the first and second portions in the second direction and having a lens centre spaced from the lens centres of the first and second portions, and the or each further portion of the lens forming a further image of the respective region of the display device, the first and second images and the or each further image being displaced from one another in the first direction.

9. A display as claimed in claim 1, in which each lens comprises at least one further portion disposed between the first and second portions and having zero optical power.

10. A display as claimed in claim 1, in which the first and second portions are arranged to focus light from the first and second sub-regions at a plane containing the first and second viewing regions, respectively.

11. A display as claimed in claim 10, in which the first and second viewing regions abut each other substantially without overlap.

12. A display as claimed in claim 1, in which the display device is pixellated and each of the first and second sub-regions comprises at least one pixel.

13. A display as claimed in claim 12 in which the at least one pixel has an edge adapted to control brightness of light from each of the first and second sub-regions.

14. A display as claimed in claim 12, in which each of the first and second sub-regions comprises at least part of a column of pixels.

15. A display as claimed in claim 1, in which the lenses are configured to optimise uniformity of brightness of light from the first and second sub-regions.

16. A display as claimed in claim 1, in which the first and second sub-regions are evenly spaced in the first direction with each of the first and second sub-regions having an aperture in the first direction substantially equal to half the pitch of the first and second sub-regions in the first direction.

17. A display as claimed in claim 1, comprising an angularly dependent diffuser for passing on-axis light substantially clearly and for diffusing off-axis light propagating at more than a predetermined angle to the optical axis of the diffuser.

18. A multiple view display of claim 2, further comprising an angularly dependent diffuser for passing on-axis light substantially clearly and for diffusing off-axis light propagating at more than a predetermined angle to the optical axis of the diffuser.

* * * * *